United States Patent Office 3,361,686
Patented Jan. 2, 1968

3,361,686
RESINS FROM 1,2-DI(1,2-EPOXYETHYL)
CYCLOBUTANE
Samuel W. Tinsley and Donald L. MacPeek, Charleston, W. Va., assignors to Union Carbide Corporation, a corporation of New York
No Drawing. Original application Apr. 27, 1961, Ser. No. 105,880. Divided and this application Feb. 17, 1966, Ser. No. 528,070
11 Claims. (Cl. 260—2)

ABSTRACT OF THE DISCLOSURE

Resins resulting from the reaction of 1,2-di(1,2-epoxyethyl)cyclobutane with/without polyfunctional organic hardeners such as polycarboxylic acids, polycarboxylic acid anhydrides, polyhydric alcohols, polyhydric phenols, polyfunctional amines, and the like. The polymerizable compositions are readily handled in resin-forming operations such as coating, laminating, bonding, molding, casting, potting, and the like.

This application is a divisional of application Ser. No. 105,880, filed Apr. 27, 1961, and now abandoned, entitled "Diepoxide Compositions," by S. W. Tinsley and D. L. MacPeek, both of the aforesaid application being assigned to a common assignee.

This invention relates to the preparation of 1,2-di(1,2-epoxyethyl)cyclobutane. In one aspect, the invention relates to curable, polymerizable compositions comprising 1,2-di(1,2-epoxyethyl)cyclobutane, a catalyst, and/or an active organic hardener. In various other aspects, the invention relates to the fusible thermosetting intermediate reaction products and to the cured, polymerized products which result from the aforementioned curable compositions.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. Negligible shrinkage, if any, occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting fusible thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare 1,2-di(1,2-epoxyethyl)cyclobutane. It is another object of the invention to prepare novel homopolymerized products of said 1,2-di(1,2-epoxyethyl)cyclobutane. It is, also, an object of the invention to prepare novel curable, partially cured, and cured compositions comprising 1,2-di(1,2-epoxyethyl) cyclobutane and an active organic hardener. It is another object of the invention to prepare novel curable, polymerizable compositions comprising 1,2-di(1,2-epoxyethyl)cyclobutane, an active organic hardener, and a modifying amount of a different active organic compound to thereby impart special and desirable characteristics and properties to ultimately, fully cured compositions. It is a further object of the invention to prepare novel curable compositions and partially cured compositions (fusible thermosetting intermediate reaction products) comprising 1,2-di(1,2-epoxyethyl)cyclobutane and an active organic hardener which compositions, when dissolved in an inert normally-liquid organic medium, are useful in the fields of coatings, laminates, adhesives, and the like. A still further object of the invention is to prepare novel fusible thermosetting intermediate reaction solid products resulting from the partial reaction of a composition comprising 1,2-di(1,2-epoxyethyl)cyclobutane and an active organic hardener which products are useful as molding powder compositions. A yet further object of the invention is to provide novel curable and fully cured compositions comprising 1,2-di(1,2-epoxyethyl)cyclobutane, a polycarboxylic acid anhydride, and an ethylenically unsaturated organic compound. Another object of the invention is to provide novel and useful high molecular weight polymeric varnish compositions which result from the homopolymerization of the hydroxy- and epoxy-containing products prepared by the reaction of 1,2-di(1,2-epoxyethyl)cyclobutane and an aliphatic hydrocarbon monocarboxylic acid. It is also an object of the invention to prepare novel and useful high molecular weight polymeric varnish compositions which result from the esterification of fusible, soluble polymeric polyhydric alcohols with organic fatty acids, said polymeric polyhydric alcohols being prepared by the reaction of 1,2-di(1,2-epoxyethyl)cyclobutane and a polyol. Numerous other objects of the present invention will become apparent to those skilled in the art from a consideration of the disclosure.

The novel 1,2-di(1,2-epoxyethyl)cyclobutane which is contemplated in the invention can be characterized by the following formula:

I) 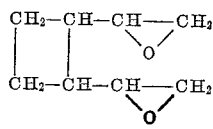

The novel 1,2-di(1,2-epoxyethyl)cyclobutane can be prepared by the reaction of the corresponding diolefinic precursor, i.e., 1,2-divinylcyclobutane, with an organic peracid. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peractic acid is most preferred. It is highly desirable to employ the peracid as a solution in an inert normally liquid organic vehicle such as ethyl acetate, butyl acetate, acetone, and the like.

A solution comprising from about 10 to about 50 weight percent of peracid, based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably from about 25° to about 75° C. It is highly desirable to employ an excess of the stoichiometric quantity of peracid (per carbon to carbon double bond of the diolefinic precursor) in order to effect or favor substantial diepoxidation of said precursor. For instance, from about 2.2 to about 10, and higher, mols of peracid per mol of diolefinic precursor can be employed with advantageous results, though lower and higher ratios of peracid to precursor can be used, if desired. The epoxidation reaction is conducted for a period of time sufficient to introduce oxirane oxygen at the site of the carbon to carbon double bonds present in the diolefinic precursor, e.g., from several minutes to several hours. Periodic analysis of samples of the reaction mixture to determine the quantity of peracid consumed during the diepoxidation reaction can be readily performed by the operator by well-known techniques. At the termination of the diepoxidation reaction, the unreacted diolefinic precursor, acid by-product, unspent peracid, inert vehicle, if employed, and the like, can be recovered from the reaction product mixture, for example, by distillation under reduced pressure. Further well-known purification techniques can be employed, as desired.

The diolefinic precursor, 1,2-divinylcyclobutane, can be prepared by non-catalyzed, thermal dimerization of 1,3-butadiene. This reaction is conducted in the liquid phase, under superatmospheric pressure, and at moderately elevated temperatures, e.g., about 100° C. to about 180° C. At the termination of the reaction, 1,2-divinylcyclobutane can be recovered from the reaction product mixture by conventional techniques such as by fractional distillation.

In one aspect, the invention is directed to the preparation of novel homopolymeric products of 1,2-di(1,2-epoxyethyl)cyclobutane. These novel homopolymeric products can be prepared by contacting 1,2-di(1,2-epoxyethyl)cyclobutane with an acidic or basic catalyst described hereinafter, at a temperature in the range of from about 25° C., and lower, to about 250° C., and higher, and for a period of time sufficient to produce said homopolymeric products. These useful products can range from soft to hard, tough resins.

The acidic and basic catalysts which can be employed in the polymerization reaction include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the tertiary amines, e.g., alphamethylbenzyldimethylamine, dimethyethylamine, triethylamine, tripropylamine, trimethylammonium hydroxide, and the like.

Catalyst concentrations and polymerization temperatures are believed to affect the polymerization rate, the higher concentrations and temperatures promoting faster reaction rates than the lower ones. The catalyst concentration can be varied over a broad range and can be selected on the basis of the rate of polymerization desired and the polymerization temperature to be used. It has been observed that a catalyst concentration in the range of from about 0.005 to 15 weight percent, preferably from about 0.01 to 5 weight percent, based on the weight of 1,2-di(1,2-epoxyethyl)cyclobutane, is advantageous in forming useful polymeric products.

In other aspects, the invention is directed to novel curable, polymerizable compositions comprising 1,2-di(1,2-epoxyethyl)cyclobutane and an active organic hardener, and to the partially cured (fusible thermosetting intermediate reaction products) and cured resins resulting therefrom. The active organic hardeners illustrated hereinafter are employed in a curing amount that is, an amount which is sufficient to cause the curable system comprising the novel diepoxide(s) to become a thermosetting or thermoset copolymeric resin in accordance with the teachings of the instant specification. Representative active organic hardeners include polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyisothiocyanates, polyacyl halides, and the like. The novel curable compositions can contain one active organic hardener or a mixture of active organic hardeners.

The curable compositions of the invention can be prepared by mixing 1,2-di(1,2-epoxyethyl)cyclobutane with the active organic hardener(s), preferably under agitation, so as to obtain a homogeneous mixture. The order of addition of the components does not appear to be critical. Heating is advantageous in facilitating the formation of a solution. The application of heat should not be prolonged to the extent that appreciable curing takes place.

The curable compositions of the invention can be partially cured or fully cured by maintaining the temperature in the range of from about 25° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 25° C. to 250° C. can be employed, if desired, to effect the full cure. For casting purposes, the preferred minimum temperature of the normally-solid curable compositions is that at which said compositions form a uniform melt, whereas for coatings and the preparation of laminates, the use of solvents will allow the use of lower temperatures.

The time for effecting the partial cure or the complete cure will be governed, to an extent, on several factors such as the particular active organic hardener(s) employed, the proportions of 1,2-di(1,2-epoxyethyl)cyclobutane and active organic hardener(s), the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to 24 hours, depending upon the correlation of such factors as illustrated above.

If desired, basic or acidic catalysts such as those illustrated previously can be incorporated into the curable compositions of the invention to increase the cure rate and/or reduce the gelation period. It is generally suitable to add the catalyst to the curable composition which is maintained at a temperature in the range of from about 10° to 100° C. Agitation of the curable composition prior to, during, and after the incorporation of the catalyst is desirable to ensure a homogeneous mixture. Catalyst concentrations of the order described previously can be employed.

In one preferred embodiment, the invention is directed to novel curable, partially cured, and cured compositions comprising 1,2-di(1,2-epoxyethyl)cyclobutane and a polycarboxylic acid in such relative amounts so as to provide from about 0.1 to about 2.0 carboxy groups, i.e., —COOH groups, of said polycarboxylic acid per epoxy group, i.e.,

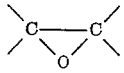

group, of the diepoxide, and preferably from about 0.3 to about 1.2 carboxy groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaconic acid, isopropylidenemalonic acid, allylmalonic acid, muconic acid, alpha-hydromuconic acid, beta-hydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexantricarboxylic acid, 2-propyl-1,2,4-pentanetricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, and the like. Copolymers of acrylic acid and an olefinically unsaturated monomer such as butadiene, styrene, ethyl acrylate, vinyl halide, and the like also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable.

In a second preferred embodiment, the invention is directed to novel curable, partially cured, and cured compositions comprising 1,2-di(1,2-epoxyethyl)cyclobutane and a polycarboxylic acid anhydride in such relative amounts so as to provide from about 0.1 to about 4.0 carboxy groups of the polycarboxylic acid anhydride per epoxy group of the diepoxide, and preferably from about 0.8 to about 2.5 carboxy groups per epoxy group. It should be noted that by the expression "carboxy groups of the polycarboxylic acid anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of polycarboxylic acid anhydride" is meant the carboxy groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides, and preferably, the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, penetenylsuccinic anhydride, propylsuccinic anhydride, 4-nitrophthalic anhydride, 1-2-naphthalic anhydride, 2,3-naphthalic anhydride, 1,8-naphthalic anhydride, tetrabromophthalic anhydride, tetraiodophthalic anhydride, and the like. Polycarboxylic acid anhydrides which have melting points below about 250° C. are desirable.

In a third preferred embodiment, the invention is directed to novel curable, partially cured, and cured compositions comprising 1,2-di(1,2-epoxyethyl)cyclobutane and a polyol in such relative amounts so as to provide from about 1.0 to about 2.0 hydroxy groups, i.e., —OH groups, of said polyol per epoxy group of the diepoxide, and preferably from about 0.2 to about 1.0 hydroxy group per epoxy group. By the term "polyol," as used herein including the appended claims, is meant an organic compound having at least two hydroxyl groups, which are alcoholic hydroxy groups, phenolic hydroxy groups, or both alcoholic and phenolic hydroxy groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, 2-butene-1,4-diol, the pentanediols, the pentenediols, 2-ethyl-1,3-hexanediol, the hexenediols, 2-methoxy-2,4-dimethyl-1,5-pentanediol, 12, 13-tetracosanediol, polyglycerol, 1,1,1 - trimethylolpropane, pentaerythritol, sorbitol, the polyvinyl alcohols, the octenediols, the cyclopentanediols, the cyclohexanediols, the lower alkyl substituted-cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis(4-hydroxyphenyl)methane, 1,9-naphthalenediol, the polyhydric phenol-formaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C. are desirable.

A fourth preferred embodiment of the invention is directed to novel curable, partially cured, and cured compositions comprising 1,2-di(1,2-epoxyethyl)cyclobutane and a polycarboxy polyester in such relative amounts so as to provide from about 0.1 to about 2.0 carboxy groups of said polycarboxy polyester per epoxy group of the diepoxide, and preferably from about 0.3 to about 1.2 carboxy groups per epoxy group. By the term "polycarboxy polyester," as used herein including the appended claims, is meant a polyester which contains at least two carboxy groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxy groups, collectively, than are required to react with the hydroxy groups contained in the amount of polyhydric alcohol so that the resulting esterified product, i.e., polycarboxy polyester, contains at least two free carboxy groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by contendsing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C., with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion of the four preferred embodiments. Special and highly desirable effects can be imparted to the partially cured and fully cured compositions by incorporating a second active organic hardener (hereinafter termed "modifier") into the curable composition comprising the diepoxide monomer and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the monomeric diepoxide. For instance, to a curable composition comprising 1,2-di(1,2-epoxyethyl)cyclobutane and a polycarboxylic acid, there can be added an amount of a modifier, e.g., polycarboxylic acid anhydride, polycarboxy polyester, polyol, etc., such that the ratio of reactive groups contained by the modifier with respect to the carboxy groups contained by the polycarboxylic acid is less than one. On this basis the modifier can be considered to be the minor component in relation to the polycarboxylic acid. As a second illustration, if the curable composition comprises 1,2-di(1,2-epoxyethyl)cyclobutane and a polyol, an amount of modifier, e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxy groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

A fifth preferred embodiment is directed to curable, partially cured, and cured compositions comprising 1,2-di(1,2-epoxyethyl)cyclobutane and a polyfunctional amine in such relative amounts so as to provide from about 0.2 to about 5.0 amino hydrogen atoms of said polyfunctional amine per epoxy group of the diepoxide, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amide subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

The thermoset cured resins of the invention vary from soft and flexible to hard and rigid products, depending upon the proportion, the functionality, and the chain length of the active organic hardener employed. These resins are insoluble in many of the common organic solvents. The hard, infusible, rigid thermoset resins can be machined to desired shapes and configurations, and they can be polished to provide appealing finishes. The novel compositions, as indicated throughout the specification, are highly useful and valuable in fields such as the coatings, laminating, molding, encapsulation, etc, arts.

A sixth highly preferred embodiment is directed to curable, partially cured, and cured compositions comprising 1,2-di(1,2-epoxyethyl)cyclobutane, a polycarboxylic acid anhydride which contains a polymerizable double bond, and an active olefinically unsaturated organic monomer. To the curable mixture, there can be added a fourth component, that is, a polyol such as those previously described. The polyol can contain olefinic unsaturation or it can be fully saturated. However, should the polyol contain olefinic unsaturation, then the polycarboxylic acid anhydride component can be fully saturated, if desired. Thus, in the four component system both the polycarboxylic acid anhydride and the polyol components can contain olefinic unsaturation, or either component can contain olefinic unsaturation. The three and four component curable systems have been found to possess several highly desirable and unexpected advantages. The preferred systems cure very readily and gelation is often-times manifest at room temperature. Many of the resulting cured resins exhibit high and efficient thermal stability at elevated temperatures by virtue of including the active olefinically unsaturated organic monomer in the curable compositions. The inclusion of the active olefinically unsaturated organic monomer to the curable system also results in the lowering of the melt temperature, and in the reduction of the viscosity of the system as compared to the corresponding curable system lacking same. The saturated and unsaturated polycarboxylic acid anhydrides and polyols have been illustrated previously. Maleic anhydride is highly preferred as the polycarboxylic acid anhydride component. It is desirable that the relative proportions of monomeric diepoxide, polycarboxylic acid anhydride, and active olefinically unsaturated organic monomer, with or without the polyol component (preferably polyhydric alcohol compound), comprising the curable compositions are such so as to provide from about 0.2 to about 5.0 (preferably from about 0.4 to about 2.0) carboxy groups of anhydride per epoxy group of monomeric diepoxide, and from 0.0 to about 2.0 (preferably from about 0.05 to about 1.0) hydroxy groups of polyol per epoxy group of monomeric diepoxide. The quantity of active olefinically unsaturated organic monomer is most conveniently based on a ratio of ethylenic groups of said monomer per ethylenic group of polycarboxylic acid anhydride and/or polyol. Thus, it is desirable to employ the polycarboxylic acid anhydride, polyol, and active olefinically unsaturated organic monomer in amounts so as to provide from about 0.002 to about 5.0, preferably from about 0.2 to about 2.0, ethylenic groups of active olefinically unsaturated organic monomer per ethylenic group of polycarboxylic acid anhydride and/ or polyol. It should be noted that the term "ethylenic group" refers to the $>C=C<$ group. Illustrative active olefinically unsaturated monomers include the mono- and polyolefinic hydrocarbons, e.g., the heptenes, the nonenes, hexadiene, cyclopentene, cyclohexene, lower alkyl substituted-cyclohexene, styrene, divinylbenzene, and the like; the olefinic esters, ethers, and acids, e.g., divinyl ether, diallyl ether, di(2-butenyl) ether, methyl methacrylate, propyl acrylate, methyl acrylate, ethyl acrylate, methyl crotonate, allyl crotonate, crotonic acid, cinnamic acid, acrylic acid, diallyl phthalate, 2-pentenoic acid, and the like; and the halogenated vinylbenzenes, and the like. Styrene is highly preferred.

The use of catalysts in the novel curable compositions described in the sixth embodiment is optional. Acidic and basic catalysts such as those described previously can be employed, if desired, to increase the rate of reaction between the polycarboxylic acid, anhydride and the diepoxide. In certain instances, it may be desirable to catalyze the reaction or polymerization of the polycarboxylic acid anhydride and the active olefinically unsaturated organic monomer. Among such latter catalysts are, by way of illustration, benzoyl peroxide, t-butyl hydroperoxide, cumene hydroperoxide, acetyl peroxide, p-menthane hydroperoxide, lauroyl peroxide, di-t-butyl peroxide, t-butyl perbenzoate, and the like.

A seventh preferred embodiment is directed to curable and partially cured compositions (fusible thermosetting intermediate reaction products that are viscous liquids or solids) comprising 1,2-di(1,2-epoxyethyl)cyclobutane, and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., fusible thermosetting intermediate reaction products, to organic media will depend on various factors such as the particular mixture being cured, the degree or extent of the partial cured, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In another preferred embodiment, the invention is directed to the preparation of valuable varnishes which are obtained by the reaction of 1,2-di(1,2-epoxyethyl)cyclobutane with aliphatic monocarboxylic acids, at elevated temperatures, e.g., from about 100° to about 200° C., for a period of time ranging from about 0.5 to 10 hours, and longer, followed by homopolymerizing the resulting reaction product (which contains residual or free epoxy and hydroxy groups) with a catalyst such as those described previously, preferably at a temperature in the range of from about 25° to 250° C., to thus produce high molecular weight polymeric products commonly known to the art as varnishes. The amounts of aliphatic monocarboxylic acid and monomeric diepoxide employed are such so as to provide from about 0.3 to about 0.7 carboxy group of monocarboxylic acid per epoxy group of diepoxide. The unsaturated aliphatic monocarboxylic acids are preferred. Illustrative acids include hexanoic acid, caprylic acid, lauric acid, capric acid, myristic acid, oleic acid, linoleic acid, stearic acid, licanic acid, ricinoleic acid, hexenoic acid, hexadienoic acid, octenoic acid, and the like. Acids derived from natural sources such as castor oil, dehydrated castor oil, coconut oil, cottonseed oil, oiticaca oil, perilla oil, olive oil, safflower oil, sardine oil, soyabean oil, tall oil, tung oil, and the like, are advantageous to employ both from an economy standpoint and since highly useful varnishes result from the process. If desired, the reaction between monomeric diepoxide and the aliphatic monocarboxylic acid can be effected in the presence of an acidic or basic catalyst such as those described previously, and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like. The homopolymerization of the reaction product which contains residual or free epoxy and hydroxy groups can also be effected, if desired, in the presence of an inert normally-liquid organic medium such as those illustrated supra. The progress of the homopolymerization reaction can be observed by determining the relative viscosity of samples drawn from the reaction mixture. In this manner, it is possible to produce partially polymerized compositions or essentially complete polymerized compositions.

The polymerized compositions of the last mentioned preferred embodiment generally are obtained as solid-like products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide range of compatibility, they impart improved caustic, water, and chemical resistance to the resin coatings they are modifying, and they impart improved flexibility and toughness. The drying compositions are capable of "drying" or curing to excellent protective coatings, with or without the application of heat. It is generally desirable to employ various metallic salts of organic compounds known to the art as "driers" to accelerate the drying process. The drying can be accomplished at temperatures in the range of from about 10° to about 250° C. and for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment, valuable varnish compositions can be obtained by the reaction of 1,2-di(1,2-epoxyethyl)cyclobutane with polyol(s), preferably diol(s), at a temperature in the range of from about 25° to about 250° C., for a period of time ranging from about 0.5 to 10.0 hours, and longer, followed by partial or essentially complete esterification of the fusible, polymeric polyhydric product with an aliphatic monocarboxylic acid, preferably at elevated temperatures, to produce high molecular weight polymeric products (varnishes) which may contain residual or free hydroxy groups. The proportions of polyol and monomeric diepoxide employed are such so as to provide from about 0.5 to about 1.5 hydroxy groups of polyol per epoxy group of monomeric diepoxide. The polyols and aliphatic monocarboxylic acids which can be employed have been illustrated previously. The use of catalysts and solvents, if desired, has also been discussed supra.

In a yet further preferred embodiment, the novel diepoxide of the invention can be applied to cellulosic and cellulosic-containing textile fabric in the form of an aqueous system or dissolved in an inert, normally-liquid organic solvent which is miscible with water, and subsequently cured within the fibers of said fabric. The cure step can be accelerated by means of acidic catalysts such as the fluoborates of magnesium, tin, cadmium, sodium, zinc, and the like. Also, the acidic catalysts described previously can be employed. The concentration range of the acidic catalyst is of the magnitude set forth previously. In general, it is desirable to immerse the fabric in an aqueous system which contains from about 1 to about 30, preferably from about 3 to about 20, weight percent of the novel diepoxide, and thereafter pass the "wet" fabric through a squeeze roller. One or more immersions (and squeezings) can be employed, if desired. The aqueous system, also, can contain plasticizers, natural resins, textile softening agents, etc., which are well known to the art. Excess water is removed from the fabric by air-drying, or preferably at a temperature of from about 35° to 80° C. for a few minutes, e.g., 1 to 5 minutes, or longer. Neither the drying time nor the temperature range is narrowly critical. The main purpose is to remove excess water, and as such, this step is readily accomplished by those skilled in the art. Thereafter, the fabric can be "cured" at a temperature which is sufficient to promote the reaction of the diepoxide with the fibrous material being treated. A wide "cure" temperature can be employed, e.g., from about 120° C., and lower, to about 200° C., and higher, and the time can range from several seconds to 15 minutes, and longer. After this step, it is highly desirable to scour the fabric to remove unreacted diepoxide and acidic catalyst therefrom. The resulting treated fabric exhibits increased shrink and crease resistance and a soft smooth finish after laundering (without the necessity of ironing said fabric).

In the following illustrative examples, the Barcol hardness values were determined by the use of Barcol Impressor GYZJ–934–1 at a temperature of approximately 25° C. Also, unless otherwise indicated, the examination or description of the resins was determined at about 25° C. In Examples 2 through 8, the curable systems, when necessary, were heated gently until homogeneity occurred, followed by quickly cooling the resulting solution to room temperature, i.e., about 25° C. These systems then were allowed to stand, at room temperature, for two days prior to the curing cycle. The term "acid number" is the number of milligrams of potassium hydroxide which are required to neutralize the free acid in a gram of substance. The "acid numbers" are determined by dissolving the sample for analysis in acetone and titrating with a standard alcoholic potassium hydroxide solution using phenolphthalein as the indicator. When a solvent is present with the reaction mixture being analyzed, the acid numbers reported are for the reaction mixture only and a correction is made so as not to include the solvent. Total solids present in the polymer solutions are determined by weighing about a one-gram sample of the solution in an aluminum weighing dish measuring about two inches in diameter, heating the open dish in a mechanically convected oven at 160° C. for about fifteen minutes, cooling it to room temperature, and weighing the residue.

*Example 1*

To a two-liter four-necked reaction flask equipped with a stirrer, a thermometer, a reflux condenser, and an addition funnel, there was added 150 grams (1.38 mols) of trans-1,2-divinylcyclobutane, followed by the addition of 150 grams of ethyl acetate (as a diluent). Subsequently, over a one-hour period, 904 grams (3.03 mols) of a 25.6 weight percent solution of peracetic acid in ethyl acetate was added to the reaction flask, the contents of which were maintained at 47°–50° C. The ensuing epoxidation reaction was sufficiently exothermic in nature so as to require cooling of the reaction flask with an ice-acetone bath throughout the addition period. Immediate analysis for unspent peracetic acid indicated that 72 percent of the available diolefin had been consumed during the addition period. The resulting reaction mixture was maintained at about 50° C. for approximately 4.5 hours after which period of time analysis established that the reaction of the diolefin with peracetic acid was essentially complete. The reaction product mixture was cooled, and then slowly introduced, over a period of one hour, into a still system which contained refluxing ethyl-benzene (at 40 mm. of Hg) whereby ethyl acetate, acetic acid by-product, and unreacted peracetic acid were removed therefrom. Continued fractional distillation yielded 160 grams of trans-1,2-di(1,2-epoxyethyl)cyclobutane which had the following properties:

Boiling point, 63° C./0.07 mm. of Hg $n_D^{30}$ 1.4636

Purity as expoxide (pyridine hydrochloride/pyridine) 98 percent

*Elemental Analysis.*—Found: Carbon, 68.58%; Hydrogen, 8.66%. Calculated: Carbon, 68.54%; Hydrogen, 8.63%.

The infrared spectrum was consistent with the assigned structure.

The yield was 83 percent of the theoretical.

*Example 2*

To a glass test tube, there were charged trans-1,2-di (1,2-epoxyethyl)cyclobutane (0.7 gram) and diethylenetriamine (0.22 gram) in amounts so as to provide 1.0 amino hydrogen atom of the diethylenetriamine per epoxy group of the diepoxide. The resulting admixture gelled after 8 hours at 26° C. The curing cycle was effected as follows: 75.5 hours at 26° C.; 2 hours at 50° C.; 1 hour at 80° C.; 1.5 hours at 120° C.; and 4 hours at 160° C. There was obtained a pale yellow-colored, hard, solid resin which possessed a Barcol hardness value of 58.

*Example 3*

To a glass test tube, there were charged trans-1,2-di (1,2-epoxyethyl)cyclobutane (0.7 gram) and methylenedianiline (0.5 gram) in amounts so as to provide 1.0 amino hydrogen atom of the methylenedianiline per epoxy group of the diepoxide. The resulting admixture gelled after 0.5 hour at 80° C. The curing cycle was effected as follows: 75.5 hours at 26° C.; 2 hours at 50° C.; 1 hour at 80° C.; 1.5 hours at 120° C.; and 4 hours at 160° C. There was obtained an amber-colored, solid resin which possessed a Barcol hardness value of 53.

*Example 4*

To a glass test tube, there were charged trans-1,2-di (1,2-epoxyethyl)cyclobutane (0.7 gram) and 1,2,6-hexanetriol (0.22 gram) and two drops of a 17 weight percent aqueous solution of potassium hydroxide in amounts so as to provide 0.5 hydroxy group of the 1,2,6-hexanetriol per epoxy group of the diepoxide. The resulting admixture gelled after 0.5 hour at 120° C. The curing cycle was effected as follows: 75.5 hours at 26° C.; 2 hours at 50° C.; 1 hour at 80° C.; 1.5 hours at 120° C.; and 4 hours at 160° C. There was obtained an amber-colored, solid resin which possessed a Barcol hardness value of 30.

*Example 5*

To a glass test tube, there were charged trans-1,2-di (1,2-epoxyethyl)cyclobutane (0.7 gram) and bis(4-hydroxyphenyl)-2,2-propane (0.57 gram) and one drop of 17 weight percent aqueous solution of potassium hydroxide in amounts so as to provide 0.5 hydroxy group of the bis(4-hydroxyphenyl)-2,2-propane per epoxy group of the diepoxide. The resulting admixture gelled after 0.5 hour at 120° C. The curing cycle was effected as follows: 75.5 hours at 26° C.; 2 hours at 50° C.; 1 hour at 80° C.; 1.5 hours at 120° C.; and 4 hours at 160° C. There was obtained a pale yellow-colored, tough, solid resin which possessed a Barcol hardness value of 30.

*Example 6*

To a glass test tube, there were charged trans-1,2-di (1,2-epoxyethyl)cyclobutane (0.7 gram), maleic anhydride (0.49 gram), and ethylene glycol (0.1 gram) in amounts so as to provide 1.0 carboxy group of the maleic anhydride and 0.2 hydroxy group of the ethylene glycol per epoxy group of the diepoxide. The resulting admixture gelled after 8 hours at 26° C. The curing cycle was effected as follows: 75.5 hours at 26° C.; 2 hours at 50° C.; 1 hour at 80° C.; 1.5 hours at 120° C.; and 4 hours at 160° C. There was obtained a pale yellow-colored, solid resin which possessed a Barcol hardness value of 43.

*Example 7*

To a glass text tube, there were charged trans-1,2-di (1,2-epoxyethyl)cyclobutane (0.7 gram) and two drops of a 17 weight percent aqueous solution of potassium hydroxide. The resulting admixture gelled after 0.5 hour at 120° C. The curing cycle was effected as follows: 75.5 hours at 26° C.; 2 hours at 50° C.; 1 hour at 80° C.; 1.5 hours at 120° C.; and 4 hours at 160° C. There was obtained a pale yellow-colored, solid resin.

*Example 8*

To a glass test tube, there were charged trans-1,2,-di (1,2-epoxyethyl)cyclobutane (0.7 gram) and boron trifluoridepiperidine complex (0.05 gram). No gelation was observed. The curing cycle was effected as follows: 75.5 hours at 26° C.; 2 hours at 50° C.; 1 hour at 80° C.; 1.5 hours at 120° C.; and 4 hours at 160° C. There was obtained a dark amber-colored, soft, tacky resin.

*Example 9*

To a reaction vessel, there are charged 1,2-di(1,2-epoxyethyl)cyclobutane and adipic acid in amounts so as to provide 1.0 carboxy group of the acid per epoxy group of the diepoxide. The resulting admixture subsequently is heated to 80° C. for a period of 2 hours plus 4 hours at 120° C. plus an additional 4 hours at 180° C. There is obtained a hard, tough, solid resin.

*Example 10*

To a reaction vessel, there are charged 1,2-di(1,2-epoxyethyl)cyclobutane and sebacic acid in amounts so as to provide 1.2 carboxy groups of the acid per epoxy group of the diepoxide. The resulting admixture subsequently is heated to 100° C. for a period of 2 hours plus 4 hours at 140° C. plus an additional 4 hours at 200° C. There is obtained a hard, solid resin.

*Example 11*

To a reaction vessel, there are charged 1,2-di(1,2-epoxyethyl)cyclobutane and succinic anhydride in amounts so as to provide 1.0 carboxy group of the anhydride per epoxy group of the diepoxide. The resulting admixture subsequently is heated to 80° C. for a period of 2 hours plus 4 hours at 120° C. plus an additional 4 hours at 160° C. There is obtained a hard, solid resin.

*Example 12*

To a reaction vessel, there are charged 1,2-di(1,2-epoxyethyl)cyclobutane and maleic anhydride in amounts so as to provide 1.0 carboxy group of the anhydride per epoxy group of the diepoxide. The resulting admixture subsequently is heated to 80° C. for a period of 2 hours plus 4 hours at 120° C. plus an additional 4 hours at 180° C. There is obtained a hard, tough, solid resin.

*Example 13*

To a reaction vessel, there are charged 1,2-di(1,2-epoxyethyl)cyclobutane and chlorendic anhydride in amounts so as to provide 1.0 carboxy group of the anhydride per epoxy group of the diepoxide. The resulting admixture subsequently is heated to 120° C. for a period of 6 hours plus an additional 6 hours at 160° C. There is obtained a hard, strong, solid resin.

*Example 14*

A mixture is prepared from 1,2-di(1,2-epoxyethyl)cyclobutane and adipic acid in amounts so as to provide 0.7 carboxy group of the acid per epoxy group of the diepoxide. The resulting mixture is heated to 100° C. for a period of 12 minutes, and upon cooling to room temperature, i.e., approximately 24° C., a fusible, thermosetting product is obtained. The resulting product is dissolved in methyl isobutyl ketone at 100° C., and an iron panel or strip is dipped into the resulting solution. The iron panel subsequently is removed from this solution, is air dried for 30 minutes, and is baked at 160° C. for 2 hours. A thin coating is observed on that portion of the dipped iron panel. The resulting coating on the panel is glossy and tough. The coating displays excellent adhesion to the panel.

*Example 15*

A mixture is prepared from 1,2-di(1,2-epoxyethyl)cyclobutane and phthalic anhydride in amounts so as to provide 1.0 carboxy group of the phthalic anhydride per epoxy group of the diepoxide. The resulting mixture is heated to 120° C. for a period of 5 minutes, and upon cooling to room temperature, i.e., approximately 24° C., a fusible, thermosetting product is obtained. The resulting product is dissolved in butyl acetate at 100° C., and an iron panel or strip is dipped into the resulting solution. The iron panel is removed almost immediately from this solution, is allowed to air dry for 20 minutes, and subsequently is baked at 160° C. for 1.2 hours. A thin coating is observed on that portion of the dipped iron panel. The resulting coating on the panel is hard and tough. The coating displays excellent adhesion to the panel.

*Example 16*

1,2-di(1,2-epoxyethyl)cyclobutane and dehydrated castor oil acid are admixed in amounts so as to provide 0.5 carboxy group of the acid per epoxy group of the diepoxide. The resulting admixture then is heated for 3.0 hours at 200° C. to give a viscous product mixture which contains residual or free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a solution which contains 70 weight percent solids. The temperature of the resulting admixture then is brought to about 50° to 60° C. An amount of stannic chloride (0.6 weight percent, based on the weight of said viscous product mixture) contained as a solution in ethyl acetate is added dropwise to said admixture over a period of approximately one hour. As the polymerization continues, sufficient xylene is added thereto to facilitate stirring. The solids content of the resulting solution is about 55 weight percent. To the resulting high molecular weight polymeric product mixture (varnish), an iron panel is dipped therein and removed immediately. The resulting coated panel is air-dried for 25 minutes plus baking at 150° C. for 45 minutes. The coated panel resistance to boiling water (one hour) is excellent.

*Example 17*

1,2-di(1,2-epoxyethyl)cyclobutane and soyabean oil acid are admixed in amounts so as to provide 0.4 carboxy group of the acid per epoxy group of the diepoxide. The resulting admixture then is heated for 4 hours at 180° C. to give a viscous product mixture which contains residual or free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a solution which contains 73 weight percent solids. The temperature of the resulting admixture then is brought to about 55° C. An amount of boron trifluoride-diethyl ether complex (0.2 weight percent of boron trifluoride, based on the weight of said viscous product mixture) contained in excess diethyl ether is added dropwise to said admixture over a period of approximately 40 minutes. As the polymerization continues, sufficient xylene is added thereto to facilitate stirring. The solids content of the resulting solution is about 50 weight percent. To the resulting high molecular weight polymeric product mixture (varnish), an iron panel is dipped therein and removed immediately. The resulting coated panel is air-dried for 30 minutes plus baking at 160° C. for 40 minutes. The coated panel resistance to boiling water (one hour) is excellent.

Reasonable variations and modifications of the invention can be made or carried out in the light of the above disclosure without departing from the spirit and scope thereof.

What is claimed is:
1. The homopolymer of 1,2-di(1,2-epoxyethyl)cyclobutane.
2. A curable composition comprising 1,2-di(1,2-epoxyethyl)cyclobutane and a curing amount of an active organic hardener of the group consisting of polycarboxylic acids, polycarboxylic acid anhydrides, polyhydric alcohols, polyhydric phenols, polyisocyanates, and polyfunctional amines.
3. The curable composition of claim 2 wherein said active organic hardener is a polycarboxylic acid which is employed in such relative amounts so as to provide from about 0.1 to about 2.0 carboxy groups of said polycarboxylic acid per epoxy groups of said 1,2-di(1,2-epoxyethyl)cyclobutane.
4. The curable composition of claim 2 wherein said active organic hardener is a polycarboxylic acid anhydride which is employed in such relative amounts so as to provide from about 0.1 to about 4.0 carboxy groups of said polycarboxylic acid anhydride per epoxy group of said 1,2-di(1,2-epoxyethyl)cyclobutane.
5. The curable composition of claim 2 wherein said active organic hardener is a polyhydric alcohol which is employed in such relative amounts so as to provide from about 0.1 to about 2.0 hydroxy groups of said polyol per epoxy group of said 1,2-di(1,2-epoxyethyl)cyclobutane.
6. The curable composition of claim 2 wherein said active organic hardener is a polyfunctional amine which is employed in such relative amounts so as to provide from about 0.2 to about 5.0 amino hydrogen atoms of said polyfunctional amine per epoxy group of said 1,2-di(1,2-epoxyethyl)cyclobutane.
7. A cured, thermoset resin obtained by heating, to a temperature of from about 25° C. to about 250° C., a curable composition comprising 1,2-di(1,2-epoxyethyl)cyclobutane and a curing amount of an active organic hardener of the group consisting of polycarboxylic acids, polycarboxylic acid anhydrides, polyhydric alcohols, polyhydric phenols, polyisocyanates, and polyfunctional amines.
8. The cured, thermoset resin of claim 7 wherein said active organic hardener is a polycarboxylic acid.
9. The cured, thermoset resin of claim 7 wherein said active organic hardener is a polycarboxylic acid anhydride.
10. The cured, thermoset resin of claim 7 wherein said active organic hardener is a polyhydric alcohol.
11. The cured, thermoset resin of claim 7 wherein said active organic hardener is a polyfunctional amine.

References Cited

UNITED STATES PATENTS

| | | | |
|---|---|---|---|
| 2,765,296 | 10/1956 | Strain | 260—2 |
| 2,861,084 | 11/1958 | Starcher et al. | 260—348 |
| 3,063,949 | 11/1962 | Phillips et al. | 260—2 |
| 3,278,456 | 10/1966 | Starcher et al. | 260—2 |

OTHER REFERENCES

Reed, H.: Journal Chem. Soc. Pt. 1. (1951) pp. 685–687. QD. 1C6.

Vogel, E.: Annalen der Chemie vol. BD615 (1958) pp. 1–14. QD 1L7.

WILLIAM H. SHORT, *Primary Examiner.*

T. E. PERTILLA, *Assistant Examiner.*